(12) United States Patent
Gustafson

(10) Patent No.: US 10,242,803 B2
(45) Date of Patent: Mar. 26, 2019

(54) METHODS AND SYSTEMS FOR GEOMETRIC OPTIMIZATION OF MULTILAYER CERAMIC CAPACITORS

(71) Applicant: VQ RESEARCH, INC., Palo Alto, CA (US)

(72) Inventor: John L. Gustafson, Santa Clara, CA (US)

(73) Assignee: VQ RESEARCH, INC., Palo Alto, CA (US)

( * ) Notice: Subject to any disclaimer, the term of this patent is extended or adjusted under 35 U.S.C. 154(b) by 89 days.

(21) Appl. No.: 15/250,993

(22) Filed: Aug. 30, 2016

(65) Prior Publication Data

US 2017/0018365 A1    Jan. 19, 2017

Related U.S. Application Data

(63) Continuation-in-part of application No. 15/212,297, filed on Jul. 18, 2016, now Pat. No. 10,128,047.

(60) Provisional application No. 62/194,256, filed on Jul. 19, 2015, provisional application No. 62/211,792, filed on Aug. 30, 2015, provisional application No. 62/232,419, filed on Sep. 24, 2015, provisional application No. 62/266,618, filed on Dec. 13, 2015, provisional application No. 62/279,649, filed on Jan. 15, 2016.

(51) Int. Cl.
*H01G 4/30* (2006.01)
*H01G 4/12* (2006.01)
*H01G 4/232* (2006.01)

(52) U.S. Cl.
CPC ............. *H01G 4/30* (2013.01); *H01G 4/1227* (2013.01); *H01G 4/232* (2013.01)

(58) Field of Classification Search
CPC .. H01G 4/30; H01G 4/06; H01G 4/12; H01G 4/35; H01G 4/232; H01G 4/1227
See application file for complete search history.

(56) References Cited

U.S. PATENT DOCUMENTS

| | | |
|---|---|---|
| 2,816,054 A | 12/1957 | Howden |
| 3,115,581 A | 12/1963 | Kilby |
| 3,775,838 A | 12/1973 | Dalmasso |
| 3,864,817 A | 2/1975 | Lapham |
| 5,697,043 A | 12/1997 | Baskaran |

(Continued)

*Primary Examiner* — Nguyen T Ha
(74) *Attorney, Agent, or Firm* — Ricky Lam

(57) ABSTRACT

Methods and systems to improve a multilayer ceramic capacitor using additive manufacturing are disclosed. Conductive layer ends and dielectric layer edges of a multilayer ceramic capacitor may be modified to comprise a round shape, which may increase voltage limits by reducing electric field intensity that results from sharp corners. Further, the capacitor may comprise wave-like structures to increase surface area of a conductive layer and/or dielectric layer. The round shape of the conductive layer end may in-part reduce the need for a wide protective gap due to its dome-shape permitting the dielectric layer to be wider on top and bottom, and thinner at the center, e.g. concave, which provides strength support to the layers. The 3D Printing process permits the distance between the conductive layer end of the conductive layer to be much closer to the dielectric layer edge of the dielectric layer, such as below the standard 500 microns.

12 Claims, 18 Drawing Sheets

(56) References Cited

U.S. PATENT DOCUMENTS

| | | | |
|---|---|---|---|
| 5,888,329 A | 3/1999 | Cho | |
| 6,104,599 A * | 8/2000 | Ahiko | H01G 4/012 361/306.3 |
| 6,141,040 A | 10/2000 | Toh | |
| 6,365,480 B1 | 4/2002 | Huppert | |
| 6,365,960 B1 | 4/2002 | Pollock | |
| 7,199,016 B2 | 4/2007 | Heston | |
| 7,495,891 B2 | 2/2009 | Lee | |
| 7,667,302 B1 | 2/2010 | Chang | |
| 7,766,641 B2 | 8/2010 | Silverbrook | |
| 8,054,608 B2 | 11/2011 | Yoon | |
| 8,163,077 B2 | 4/2012 | Eron | |
| 8,193,532 B2 | 6/2012 | Arai | |
| 8,581,381 B2 | 11/2013 | Zhao | |
| 2003/0016484 A1 * | 1/2003 | Iwaida | B32B 18/00 361/306.3 |
| 2006/0214263 A1 * | 9/2006 | Kojima | H01G 4/012 257/532 |
| 2006/0245141 A1 * | 11/2006 | Shirasu | H01G 4/012 361/303 |
| 2009/0086402 A1 * | 4/2009 | Kato | H01G 2/14 361/301.1 |
| 2010/0103586 A1 * | 4/2010 | Tang | H01G 4/232 361/301.4 |
| 2010/0202098 A1 * | 8/2010 | Yanagida | H01G 4/232 361/305 |
| 2010/0289128 A1 | 10/2010 | Camacho | |
| 2011/0267736 A1 * | 11/2011 | Sasabayashi | H01G 4/005 361/301.1 |
| 2011/0273815 A1 * | 11/2011 | Kobayashi | H01G 4/232 361/306.3 |
| 2013/0083454 A1 * | 4/2013 | Masuda | H01G 4/06 361/503 |
| 2013/0114182 A1 | 5/2013 | Suh | |

* cited by examiner

METHODS AND SYSTEMS FOR GEOMETRIC OPTIMIZATION OF MULTILAYER CERAMIC CAPACITORS

CLAIMS OF PRIORITY

This patent application is a continuation-in-part and claims priority from:
(1) U.S. Utility patent application Ser. No. 15/212,297, titled 'Methods and systems for increasing surface area of multilayer ceramic capacitors' filed on Jul. 18, 2016, which is a U.S. provisional patent application No. 62/194,256, titled 'Methods and systems for increasing capacitance of multilayer ceramic capacitors', filed on Jul. 19, 2015.
(2) U.S. provisional patent application No. 62/211,792, titled 'Methods and systems for geometric optimization of multilayer ceramic capacitors', filed Aug. 30, 2015.
(3) U.S. provisional patent application No. 62/232,419, titled 'Methods and systems for material cladding of multilayer ceramic capacitors', filed Sep. 24, 2015.
(4) U.S. provisional patent application No. 62/266,618, titled 'Methods and systems to improve printed electrical components and for integration in circuits", filed Dec. 13, 2015.
(5) U.S. provisional patent application No. 62/279,649, 'Methods and systems to minimize delamination of multilayer ceramic capacitors", filed Jan. 15, 2016.

FIELD OF TECHNOLOGY

This disclosure relates generally to forming a novel structure of multilayer ceramic capacitors (MLCC) using the technique of drop-on-demand additive printing to deposit droplets of deposition material.

BACKGROUND

Density is a much-sought advantage in electronic components. If specifications can be maintained while reducing the size of a component, devices made from those components can be made using less material (reducing cost and weight) while also reducing bulk. Or, a component can be given enhanced specifications with the same amount of material, if that leads to superior devices. While transistor density has increased dramatically for decades, improvements in "passive" components such as capacitors have not kept pace.

Multilayer ceramic capacitors, or MLCCs, have traditionally been made by forming a tape from insulating ceramic slurry, printing conductive ink layers, and then pressing the layers together and sintering to form a laminated alternation of insulator and conductor. Particularly in the case of a physically large capacitor, there is a possibility of delamination under the stress of temperature or pressure. If a layer separates, even slightly, there is a drop in the capacitance that can render it out of specification, or there can be complete device failure. In addition, the process may be limited to simple flat layers and complex shapes may not be possible.

The goal, therefore, is to find a way to increase both the capacitance and the maximum voltage for a given form factor. As such, there is a need for a technique that is better equipped to optimize geometrical features to increase specifications of an MLCC.

SUMMARY

Disclosed are methods and systems to geometrically optimize multilayer ceramic capacitors (MLCCs). As disclosed herein, the 3D geometry of MLCC layers can be enhanced to maximize specification due to maximized uniform electric field lines and equipotential lines when the capacitor is charged.

In one aspect, the present invention discloses a system and a method to improve a ceramic capacitor using additive manufacturing, e.g., 3D Printing, where ink or aerosol jets deposit material such as, e.g., ceramic slurry, conductive ink, ferrite paste, and carbon resistor paste onto a surface. The aforementioned materials can be sintered at high temperatures, and therefore are amenable to integrated manufacture. Compared with traditional methods, this process may be inherently more precise and repeatable, has much higher geometric and spatial resolutions, and produces higher density components with less material waste. In addition, a key advantage for purposes of this invention is that more complex shapes that were not possible before can now be printed, which can be used to improve specification and/or structural integrity of the product.

A typical implementation of an additive manufacturing process begins with defining a three-dimensional geometry of the product using computer-aided design (CAD) software. This CAD data is then processed with software that slices the model into a plurality of thin layers, which are essentially two-dimensional. A physical part is then created by the successive printing of these layers to recreate the desired geometry. This process is repeated until all the layers have been printed. Typically, the resulting part is a "green" part, which may be an unfinished product that can undergo further processing, e.g., sintering. The green part may be dense and substantially non-porous.

Conductive layer ends and dielectric layer edges of a multilayer ceramic capacitor may be modified to comprise a round shape, which may increase voltage limits of the MLCC by reducing electric field intensity that results from sharp corners. Capacitor performance as a ratio to material used is highest when the electric field is as uniform as possible. If the electric field has "hot spots" as seen at a sharp corner, then the maximum operating voltage will be lower when compared with a non-sharp corner. Further, the capacitor may comprise wave-like structures to increase surface area of the conductive layer and/or dielectric layer. The precision of the method and system of the present invention allows for such complex geometries to be produced in an MLCC, which in turn allows for maximum control and adjustment of capacitor specification that was not possible before.

In addition, the round shape of the conductive layer end may in-part reduce the need for a wide protective gap due to its dome-shape permitting the dielectric layer to be wider on top and bottom, and thinner at the center, e.g. concave, which provides strength support to the layers. The 3D Printing process permits the distance between a conductive layer end of a conductive layer to be much closer to a dielectric layer edge of a dielectric layer, such as below the standard 500 microns, e.g., 1 to 499 microns. This reduction in distance equates to increased area for the conductive layer, and thus increased capacitance and operating voltage for the capacitor.

In another aspect, the present invention discloses a system and a method for optimizing geometry of a multilayer ceramic capacitor by using an algorithm of a computing device comprising a memory and processor to determine electric field lines and equipotential lines. Optimum capacitance of the capacitor may be achieved when density of field lines is as nearly uniform as possible, which can be exploited through the algorithm. For example, the above-discussed bulbous ends of conductive layer ends may reduce separation of the layers due to the bulbous ends comprising a higher thickness. The algorithm may precisely space and orientate the bulbous ends such that the most separation is achieved to reduce the field lines, which maximizes capacitance of the MLCC.

BRIEF DESCRIPTION OF THE DRAWINGS

Example embodiments are illustrated by way of example and are not limited to the figures of the accompanying drawings, in which, like references indicate similar elements.

DETAILED DESCRIPTION

Disclosed are methods, apparatus, and systems to geometrically optimize MLCC. Although the present embodiments have been described with reference to specific example embodiments, it will be evident that various modifications and changes may be made to these embodiments without departing from the broader spirit and scope of the various embodiments. In addition, the components shown in the figures, their connections, couples, and relationships, and their functions, are meant to be exemplary only, and are not meant to limit the embodiments described herein.

A capacitor is an electrical device that stores energy in the electric field between a pair of closely spaced conductors. Capacitors may be used as energy-storage devices, and may also be used to differentiate between high-frequency and low-frequency signals. Capacitance value may be defined as a measure of how much charge a capacitor can store at a certain voltage.

Figure 1:
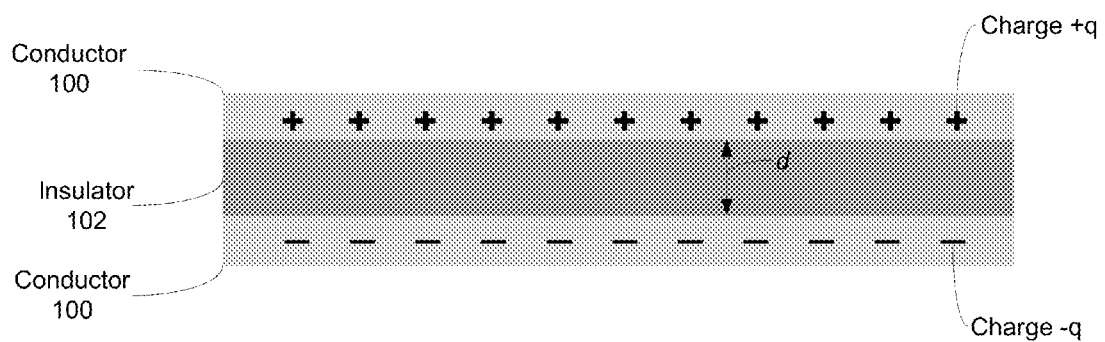
FIG. 1 is a cross-section view of an example plate capacitor.

FIG. 1 is a cross-section view of an example plate capacitor. A capacitor may comprise two conductor 100 (electrodes) separated by insulator 102. The plate capacitor may be manufactured from three parallel plates. If the plates have an area, A, that is separated by a distance d as shown, then the capacitance, C, can be expressed as the formula:

$$C = \frac{K\epsilon_0 A}{d}$$

where K is the ratio of the insulator permittivity to that of a vacuum (sometimes called the dielectric constant of the material), and $\epsilon_0$ is the permittivity of a vacuum. The formula may be inexact due to edge effects: at the border of the parallel plates, the electric field bulges away from the capacitor. If the plate size is large relative to separation 'd', the edge effect is negligible.

Figure 2:
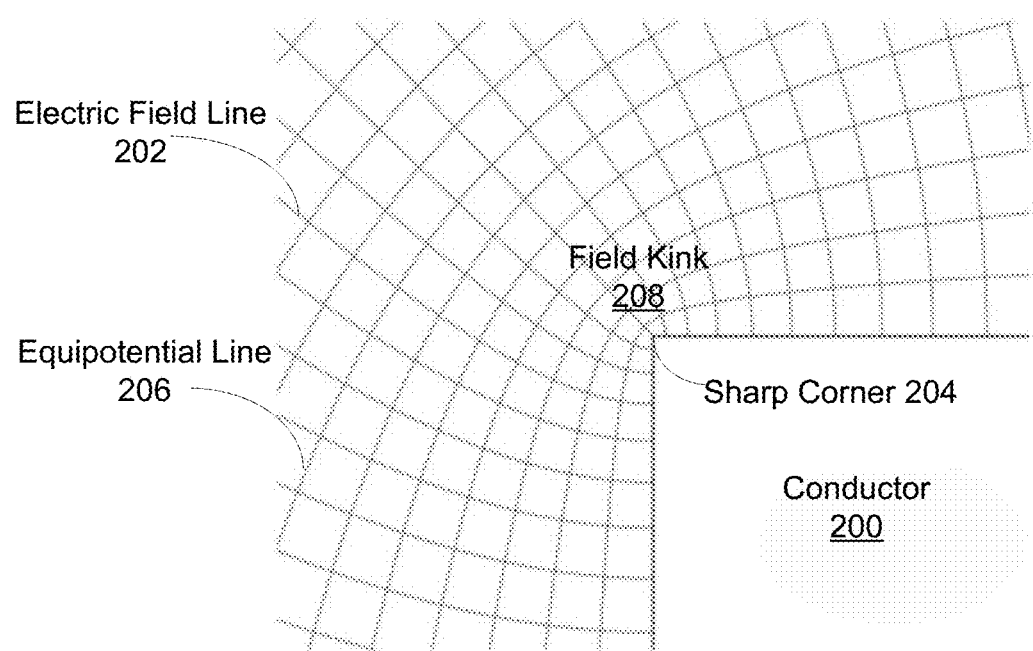
FIG. 2 shows the equipotential lines and electric field lines near a corner of a charged conductor.

FIG. 2 shows the equipotential lines and electric field lines near a corner of a charged conductor. Electric field line 202 may be normal to the surface of conductor 200, which can be of a high intensity near sharp corner 204, resulting in an electric field kink 208. Equipotential line 206 may be parallel to the conductor surface and at a right angle to electric field line 202. Since a capacitor may experience breakdown when the electric field exceeds a certain threshold level, sharp corner 204 may limit the maximum voltage to which the capacitor can be charged. If V is the maximum voltage, then the energy E that a capacitor can hold is given by the formula:

$$E = \frac{1}{2}CV^2$$

Since a use of capacitors is to store energy, anything that can increase the maximum voltage may be desirable since the energy may increase as the square of the voltage; however, exceeding the maximum voltage may cause a miniature lightning strike through the insulator that can render the capacitor inoperable.

A multilayer ceramic capacitor (MLCC) may be a device made of ceramic and metal that alternate to make a multilayer chip. The capacitance value of an MLCC may be determined by several factors, such as geometry of the part, e.g., shape and size, and total active area. The dielectric constant, K, may be determined by the ceramic material. The total active area may be the overlap between two opposing electrodes. A thickness of the dielectric ceramic material may be inversely proportional to the capacitance value such that the thicker the dielectric, the lower the capacitance value. This may also determine the voltage rating, with a thicker dielectric layer comprises a higher voltage rating that a thinner one.

Figure 3:
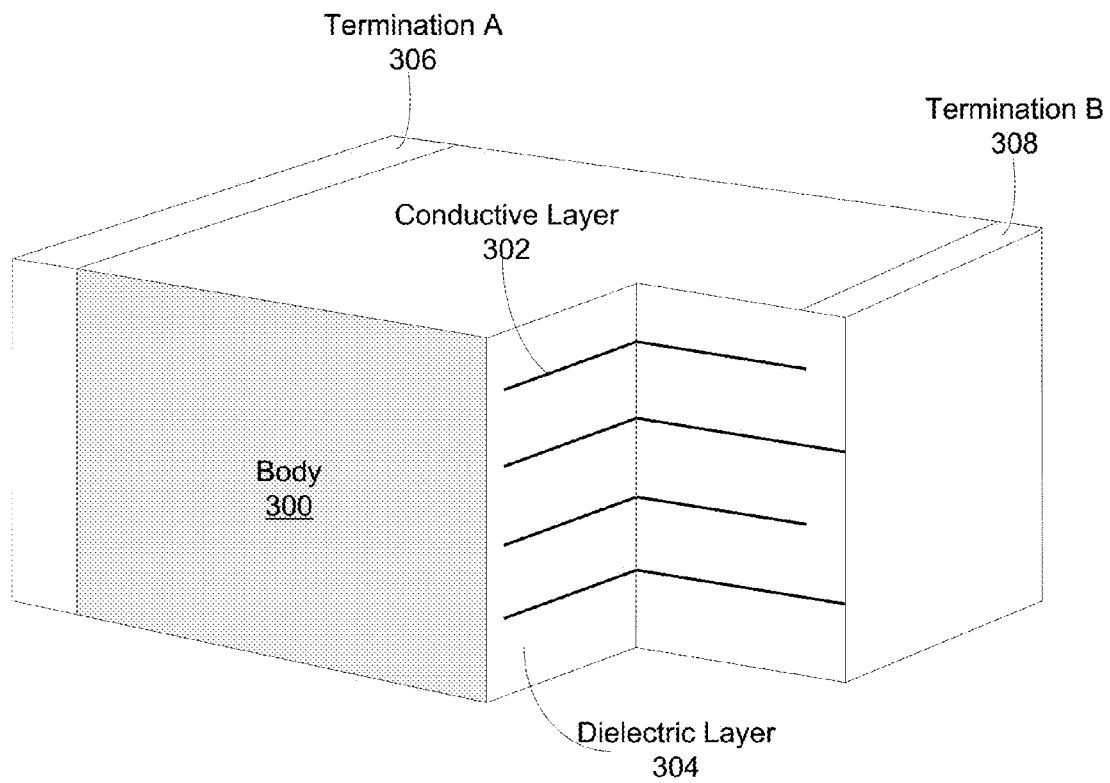
FIG. 3 is a cutaway perspective view of a conventional multilayer ceramic capacitor.

FIG. 3 is a cutaway perspective view of a conventional multilayer ceramic capacitor. The MLCC may comprise a laminated cube-shaped body 300 having alternately stacked conductive layer 302 and ceramic dielectric layer 304, and a pair of external termination A 306 and termination B 308 positioned at two opposite end portions of the body 300. The conductive layer 302 may be made from a noble metal and/or a base metal, e.g., copper, and nickel, silver, palladium, gold, and platinum. The dielectric layer 304 may be made from ceramic material comprising barium titanate.

A plurality of conductive layer 302 may be alternately connected to termination A 306 and termination B 308, such that termination A 306 is connected to every second conductive layer 302, and termination B 308 is connected with the remaining conductive layer 302 not connected to termination A 306. Conductive layer 302 and dielectric layer 304 may have flat surfaces, and the thickness of conductive layer 302 may be spatially uniform, e.g., same height. When a voltage is applied to termination A 306 and termination B 308, the MLCC may produce electric fields between every two neighboring conductive layer 302 and store electric charges therein.

Figure 4:
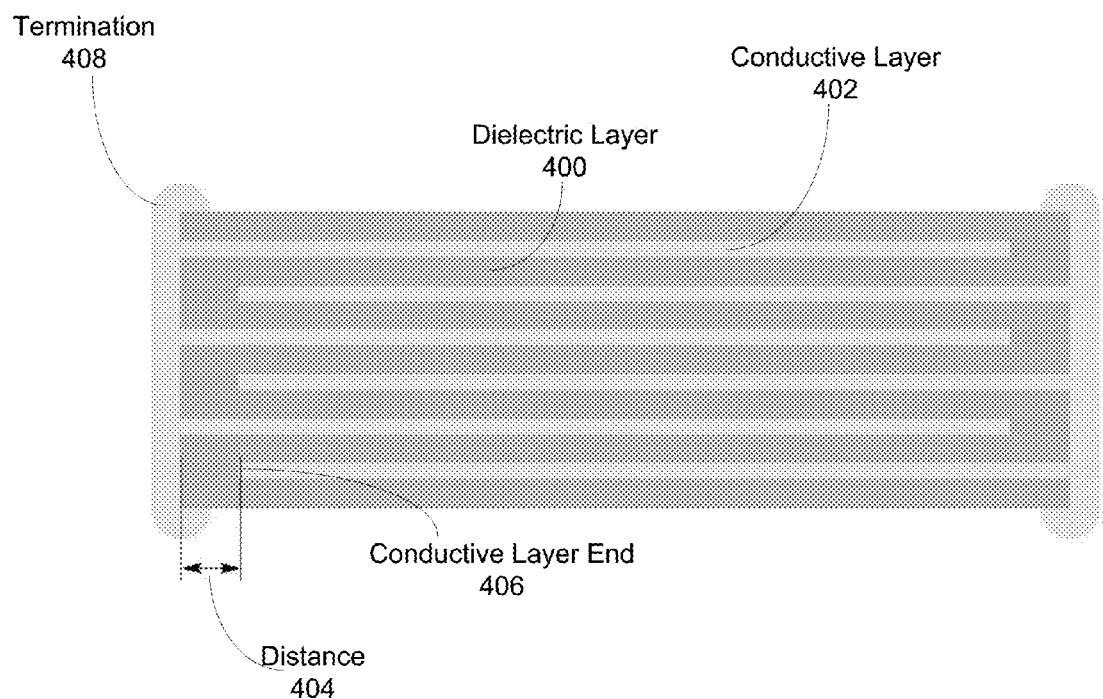
FIG. 4 is a schematic representation of a front cross-section view of a conventional multilayer ceramic capacitor.

FIG. 4 is a schematic representation of a front cross-section view of a conventional multilayer ceramic capacitor. Dielectric layer 400 and conductive layer 402 may be several microns thick, and distance 404 between a non-connecting conductive layer end 406 and a corresponding surface of termination 408 that is coupled to the capacitor's body may b e no less than 500 microns due to the imprecise nature of prior art manufacturing processes.

Multilayer ceramic capacitors have traditionally been made by forming a tape from insulating ceramic slurry, printing conductive ink layers, pressing the layers together, and then sintering to form a laminated alternation of insulator and conductor. However, particularly in the case of a physically large MLCC, there is a possibility of delamination under the stress of temperature or pressure. If a layer separates, even slightly, there is a drop in the capacitance that can render it out of specification, or there can be complete device failure. In addition, the process may be limited to simple flat layers and complex shapes may not be possible, such as to avoid sharp corners that can cause voltage breakdown.

In at least one embodiment, the present invention discloses a system and a method to improve a ceramic capacitor using additive manufacturing, e.g., 3D Printing, where ink or aerosol jets deposit material such as, e.g., ceramic slurry, conductive ink, ferrite paste, and carbon resistor paste onto a surface. The aforementioned materials can be sintered at high temperatures, and therefore are amenable to integrated manufacture. Compared with traditional methods, this process may be inherently more precise and repeatable, has much higher geometric and spatial resolutions, and produces higher density components with less material waste. In addition, a key advantage for purposes of this invention is that more complex shapes that were not possible before can now be printed, which can be used to improve specification and/or structural integrity of the product.

Figure 5:
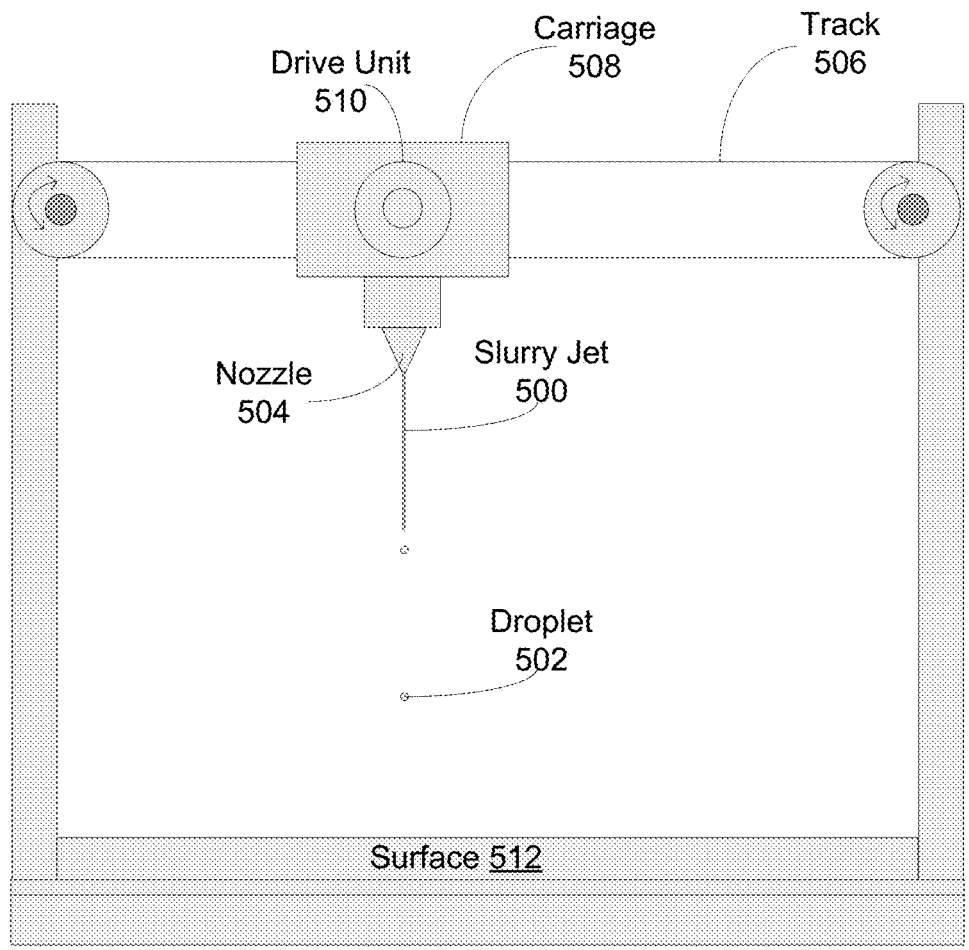
FIG. 5 is a system of a drop-on-demand type additive printer that may be used to implement one or more embodiments of the present invention.

FIG. 5 is a system of a drop-on-demand type additive printer that may be used to implement one or more embodiments of the present invention. A slurry jet 500 may be dispensed from a nozzle 504 having an orifice comprising an opening, and may be raster or vector scanned on track 506 by a carriage 508 driven by drive unit 510 over a surface 512 or on top of an already formed powder bed to define a new layer. Pressure may be used to force the slurry out of the nozzle and into a continuous stream of slurry jet 500 and/or as droplet 502, which may be defined as a breakup of the flow. A layer surface height measurement unit, such as, e.g., a laser rangefinder may be used to receive an input signal to control the height of the surface that is formed by varying the delivery of slurry.

A typical implementation of an additive manufacturing process begins with defining a three-dimensional geometry of the product using computer-aided design (CAD) software. This CAD data is then processed with software that slices the model into a plurality of thin layers, which are essentially two-dimensional. A physical part is then created by the successive printing of these layers to recreate the desired geometry. This process is repeated until all the layers have been printed. Typically, the resulting part is a "green" part, which may be an unfinished product that can undergo further processing, e.g., sintering. The green part may be dense and substantially non-porous.

Figure 6:
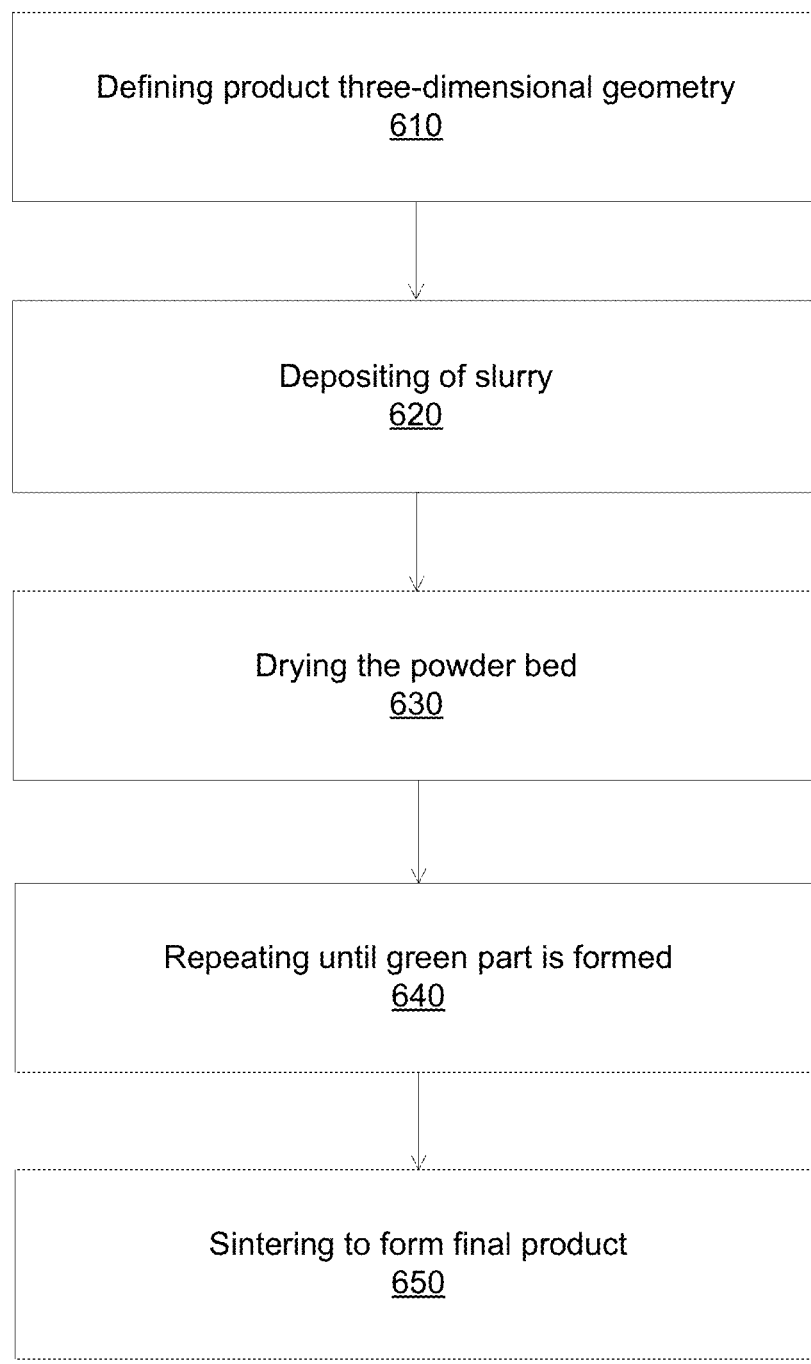
FIG. 6 is a flow diagram of a method of an additive printing process that may be implemented with one or more embodiments of the present invention.

FIG. 6 is a flow diagram of a method of an additive printing process that may be implemented with one or more embodiments of the present invention. Operation 610 defines a final product's three-dimensional geometry using CAD software. In operation 620 deposits layers of slurry comprising powder material and binder onto a surface or on top of a powder bed, which then slip-casts to make a new layer. As the slurry deposits in each two dimensional layer, the printer may select insulator or conductor as the material type, in separate passes or as a combined pass. The slurry may be deposited in any suitable manner, including depositing in separate, distinct lines, e.g., by raster or vector scanning, by a plurality of simultaneous jets that coalesce before the liquid slip-casts into the bed, or by individual drops. The deposit of slurry drops may be individually controlled, thereby generating a regular surface for each layer. Operation 630 dries any liquid from the powder bed, e.g., infrared flash-dry, after deposition of each layer. Operation 640 repeats operations 620 and 630 until a green part is formed. Operation 650 sinters the green part to form a final product. Sintering is a solid-state diffusion process that may be enhanced by increasing the surface area to volume ratio of the powder in any green part that is subsequently sintered.

Figure 7:
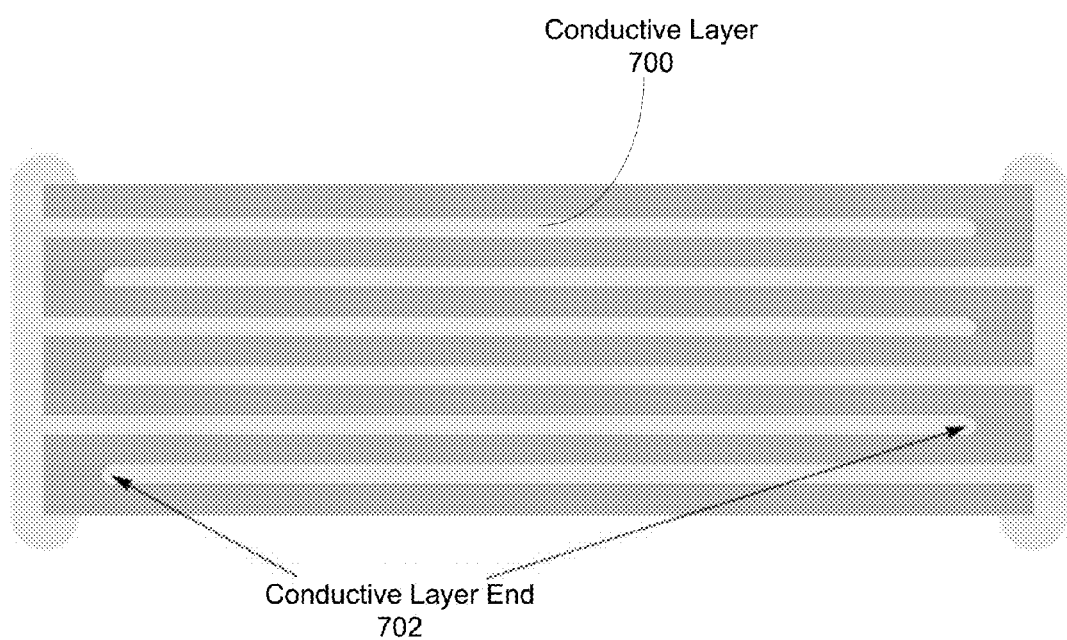
FIG. 7 shows a cross-section of a multilayer ceramic capacitor with rounded edges of the conductive layer ends, and in accordance with an embodiment of the present invention.

FIG. 7 shows a cross-section of a multilayer ceramic capacitor with rounded edges of the conductive layer ends, and in accordance with an embodiment of the present invention. Conductive layer 700 may be modified to comprise rounded convex corners of conductive layer end 702, which may increase voltage limits of the MLCC by reducing electric field intensity that results from sharp corners. The effect shown in FIG. 2 is difficult to control with the prior art tape casting process. With drop-on-demand printing, on the other hand, it is possible to construct a rounded corner that greatly reduces the electric field density to a value close or equal to that of the rest of the insulator. FIG. 7 shows a subtle but significant modification to the classic MLCC shown in FIG. 4 in which the blunt end of the conductive layer 700 is replaced with a rounded end.

Figure 8A:
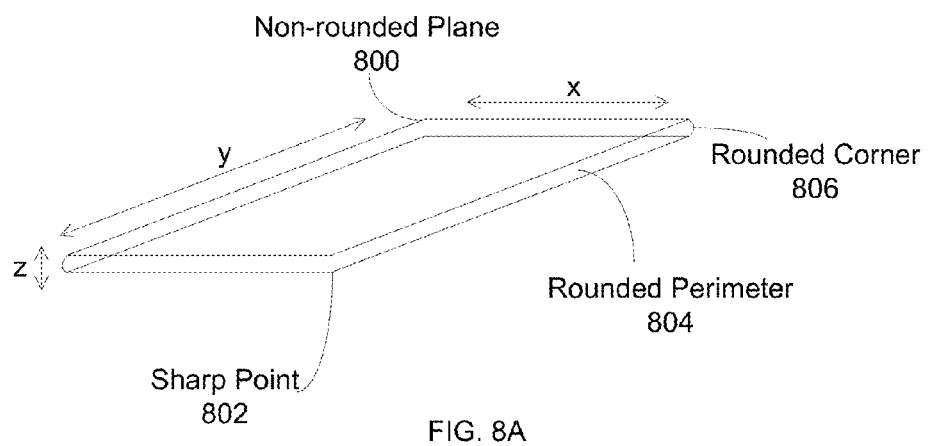
FIGS. 8A-C are schematic diagrams of alternative configurations for a conductive layer comprising rounded edges, and in accordance with at least one embodiment of the present invention.
Figure 8B:
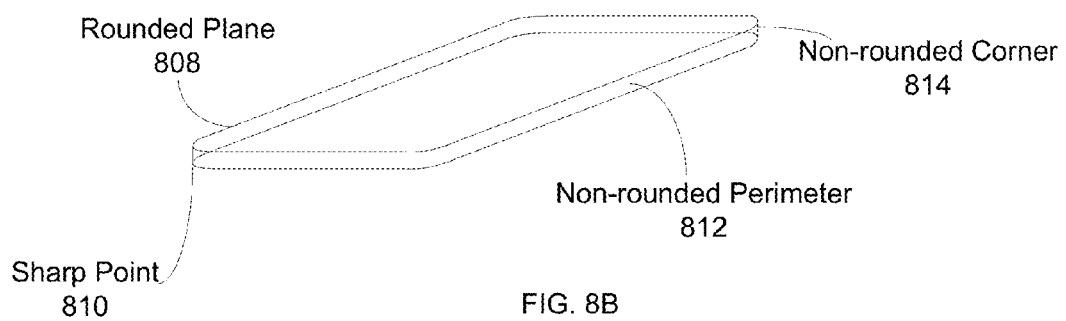
Figure 8C:
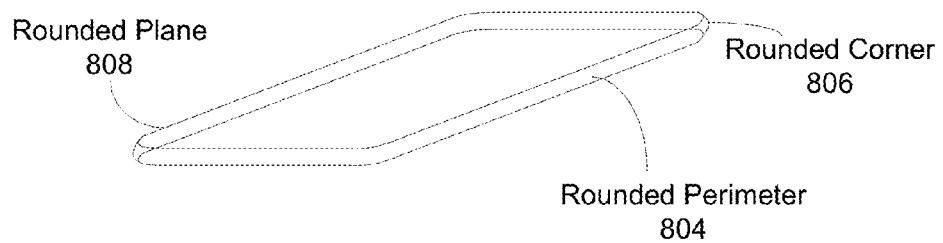

FIGS. 8A-C are schematic diagrams of alternative configurations for a conductive layer comprising rounded edges, and in accordance with embodiments of the present invention. In FIG. 8A, a conductive layer may comprise a plane disposed in the xy-direction, and a perimeter in the z-direction surrounding and directly contacting the plane. Traditionally, conductive layers comprise non-rounded plane 800 (as shown in FIG. 8A), non-rounded corners (as shown in FIG. 8B), and non-rounded perimeter edges (as shown in FIG. 8B), which includes the voltage-limiting sharp corners. In the present figure, although the planar shape of the layer is non-rounded and includes sharp point 802, the systems and methods of the present invention allows for edges in both the xy-, and z-directions to comprise rounded perimeter 804 and rounded corner 806. In some embodiments, edges of the plane and/or sides of the perimeter and/or sides of the corner of the conductive layer may alternate between rounded and non-rounded configurations, which may allow for precise adjustments of the specifications of the capacitor. The alternation may be configured in a 1:1 pattern such that a rounded or a non-rounded configuration may switch with the opposite configuration after every iteration, or it may be configured in, e.g., 1:2 or 1:3 patterns, such that for every rounded or non-rounded iteration is switched with 2 or 3 iterations of the opposite configuration, respectively. Any other pattern may be possible, such as, e.g., 2:3 or 2:5.

In FIG. 8B, a plane of a conductive layer may be a rounded plane 808, which eliminates sharp point 802 as seen in the present previous figure; however, sharp point 810 may be disposed at locations where non-rounded perimeter 812 and non-rounded corner 814 contact the rounded plane 808. The non-rounded perimeter 812 and the non-rounded corner 814 may differ from the rounded perimeter 804 and the rounded corner 806 due to being structurally straight or flat in the height direction. In other embodiments, a conductive layer may comprise a rounded corner 806 and a non-rounded perimeter, or a rounded perimeter 804 and a non-rounded corner. In FIG. 8C, a plane of a conductive layer may comprise rounded plane 808, rounded corner 806 and rounded perimeter 804. This configuration may absent of any sharp corners, if maximum voltage capacity is desired for the MLCC.

Figure 9A:
FIG. 9A is a prior art example of an MLCC conductive layer end.
Figure 9B:
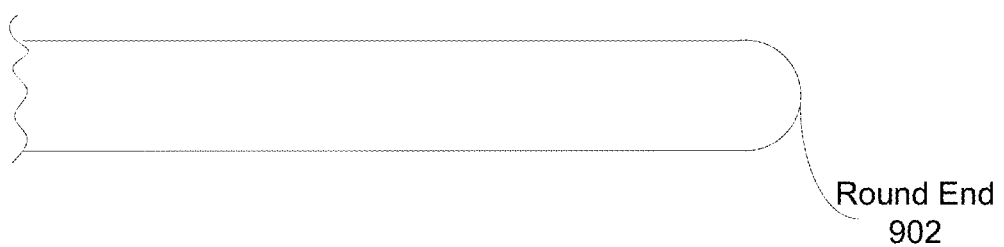
FIGS. 9B-E show alternative embodiments of the conductive layer end, according to at least one embodiment.

FIGS. 9A-E show alternative embodiments of an MLCC conductive layer end, according to at least one embodiment. FIG. 9A is a standard conductive layer end of an MLCC that's geometry is limited by its production process of tape casting. Sharp corner 900 present in the standard end produces unwanted 'hot spots' that lowers maximum operating voltage. FIG. 9B introduces a novel round end 902 of a conductor in accordance with an embodiment of the present invention. Round end 902 may comprise a convex dome shape with a wide-angle, e.g., greater than 90-degrees. This round shape is enabled by the precision of the method of drop-on-demand printing discussed above. The round shape eliminates sharp corners, therefore allows for maximum capacitance efficiency.

Figure 9C:
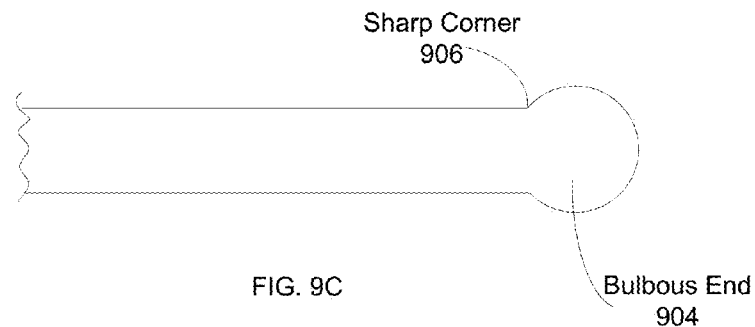
Figure 9D:
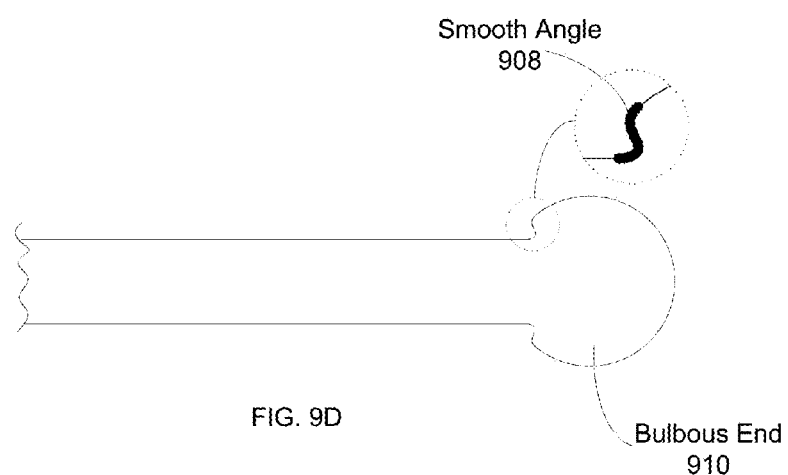
Figure 9E:
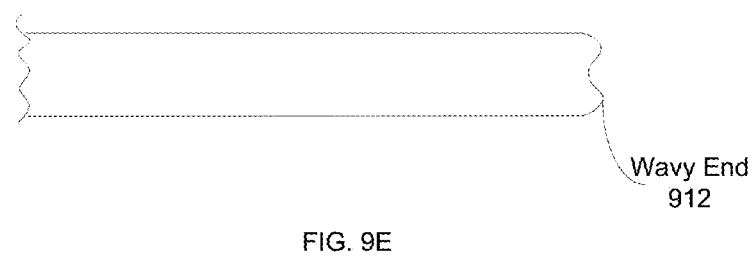

In FIG. 9C, a conductive layer end comprises a bulb shape. Bulbous end 904 may be thicker than the conductive layer and may comprise a wider-angle, e.g., greater than 90-degrees, sharp corner 906, when compared with the right-angle, e.g., 90-degrees, sharp corner 900 of FIG. 9A, thus improves voltage efficiency over the prior art. In FIG. 9D, sharp corner 906 of bulbous end 910 of FIG. 9C is further modified to comprise smooth angle 908 that may structurally resemble the letter "S", which eliminates unwanted sharp corners from the bulb configuration. Bulbous end 910 may resemble a mushroom shape. In FIG. 9E, the conductive layer end is modified into wavy end 912, which also eliminated sharp corners. Wavy end 912 may differ from round end 902 of FIG. 9B due to comprising two or more crests and one or more trough, and comprising at least one angle that is 90-degrees or less. Wavy end 912 may also be absent of any sharp corners.

Other shapes and configurations of conductive layer ends may be within the scope of the present invention. For example, the conductive layer ends of FIGS. 9A-E may comprise wave-like structures (or secondary wave-like structures in FIG. 9E) that increase surface area while still void, or minimizes the effect, of sharp corners and edges. Further, the wave-like structures may comprise secondary (or tertiary wave-like structures in FIG. 9E) to further increase surface area. The precision of the method and system of the present invention allows for such complex geometries to be produced in an MLCC, which in turn allows for maximum control and adjustment of capacitor specification that was not possible before.

Figure 10:
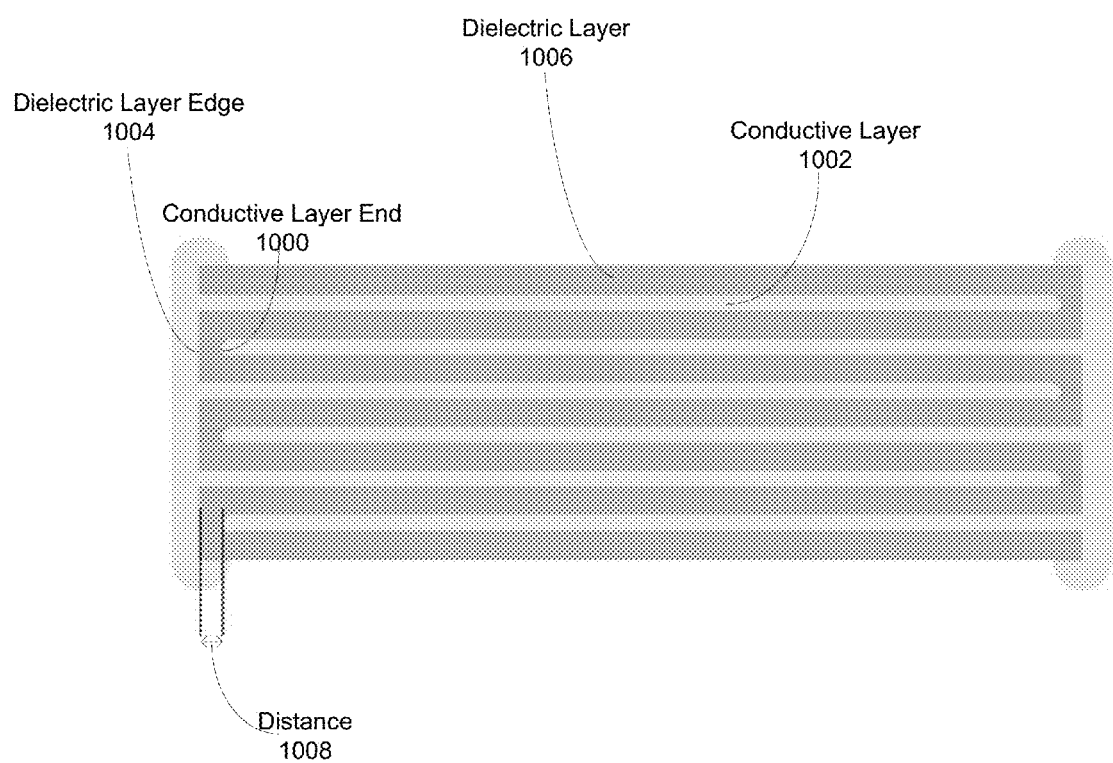
FIG. 10 illustrates a cross-section of a multilayer ceramic capacitor with a reduced gap length between dielectric layer edges and conductive layer ends, according to at least one embodiment.

FIG. 10 illustrates a cross-section of a multilayer ceramic capacitor with a reduced gap length between dielectric layer edges and conductive layer ends, according to at least one embodiment. The 3D Printing process permits distance 1008 between conductive layer end 1000 of conductive layer 1002 to be much closer to dielectric layer edge 1004, such as below the standard 500 microns, e.g., 1 to 499 micros, that is not permitted by the prior art process of tape casting. In addition, the round shape of conductive layer end 1000 may in-part reduce the need for a wide protective gap, e.g., distance 1008, due to its dome-shape permitting dielectric layer 1006 to be wider on top and bottom, and thinner at the center, e.g. concave, which provides strength support to the layers. The reduction in distance 1008 equates to increased area for conductive layer 1002, and thus increased capacitance and operating voltage for the capacitor. In some embodiments, distance 1008 between dielectric layer edge 1004 and conductive layer end 1000 is no less than the thickness of dielectric layer 1006, otherwise the electric field strength will be higher than that of the body of the capacitor and would thus reduce maximum operating voltage; however, the present invention is not so limited, and distance 1008 may be less than the thickness of dielectric layer 1006, if such configuration and/or resulting specification is desired. The dielectric layer edge 1004 may be analogous to, or in direct contact with, an inner surface of the capacitor body.

While this increase in area of conductive layer end 1002 may appear slight in the diagram when compared to FIG. 4, the figure is not drawn to scale and some of the most important commercial capacitors, such as those used for processor chip packaging, are only a few millimeters in total dimension or less. As such, to reduce a 500 micron (0.5 millimeter) gap in the design without risking electrical shorting results in a very significant increase in energy density for such small MLCCs.

Figure 11:
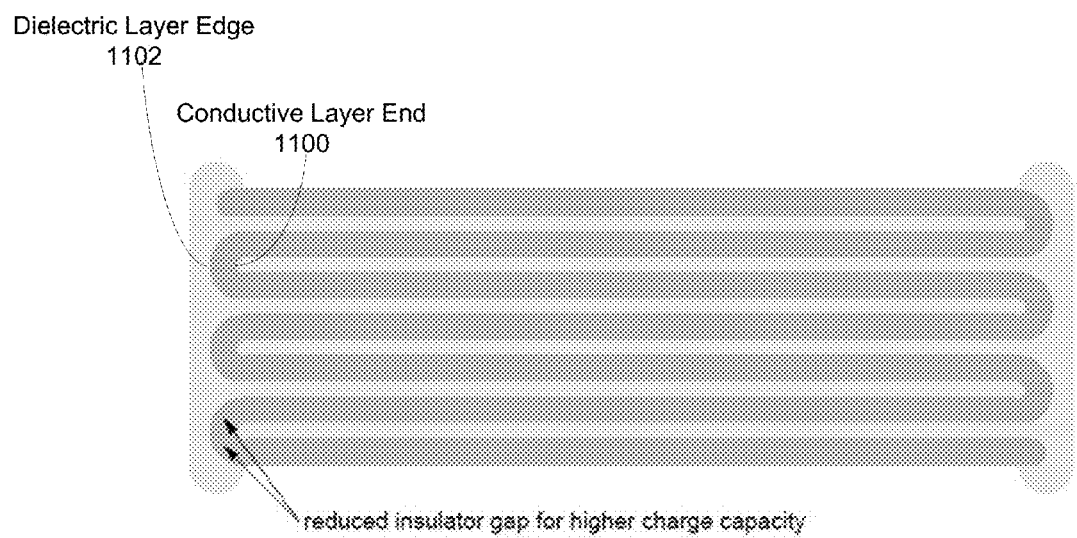
FIG. 11 illustrates a cross-section of a multilayer ceramic capacitor with rounded dielectric layer edges, according to at least one embodiment.

FIG. 11 illustrates a cross-section of a multilayer ceramic capacitor with rounded dielectric layer edges, according to at least one embodiment. Capacitor performance as a ratio to material used is highest when the electric field is as uniform as possible. If the electric field has "hot spots" as seen at a sharp corner—discussed above—then the maximum operating voltage will be lower when compared with a non-sharp corner. Conversely, if the electric field has "cool spots" where there is lower intensity as seen at a non-sharp corner, the geometry may be modified as shown to raise the local field and therefore increase the ability to store electric charge (capacitance). FIG. 11 shows a further modification to the design shown in FIG. 7 that employs this concept. Conductive layer end 1100 may comprise a round, bulbous, and/or wavy shape. Dielectric layer edge 1102 may comprise a concave shape that encompasses the round shape of conductive layer end 1100, such as an inverse round, bulbous, and/or wavy shape.

Notice that the high precision of 3D Printing permits the elimination of all sharp corners in the design, as shown in the present figure. While this increases the capacitance by reducing one of the "edge effects", it does so by trading insulator material for conductive material; however, and particularly when conductive material is based on noble metals, this has the potential of raising the total cost of the material used.

Figure 12A:
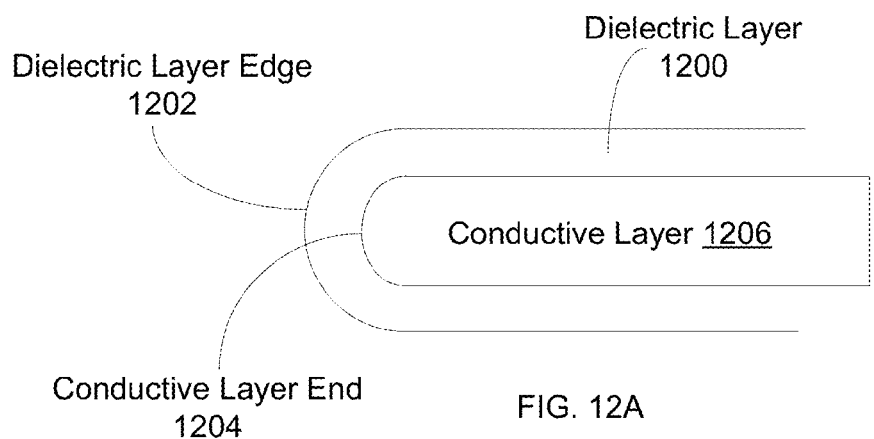
FIGS. 12A-C illustrate alternative configurations of a dielectric layer edge encompassing a conductive layer end, according to at least one embodiment.
Figure 12B:
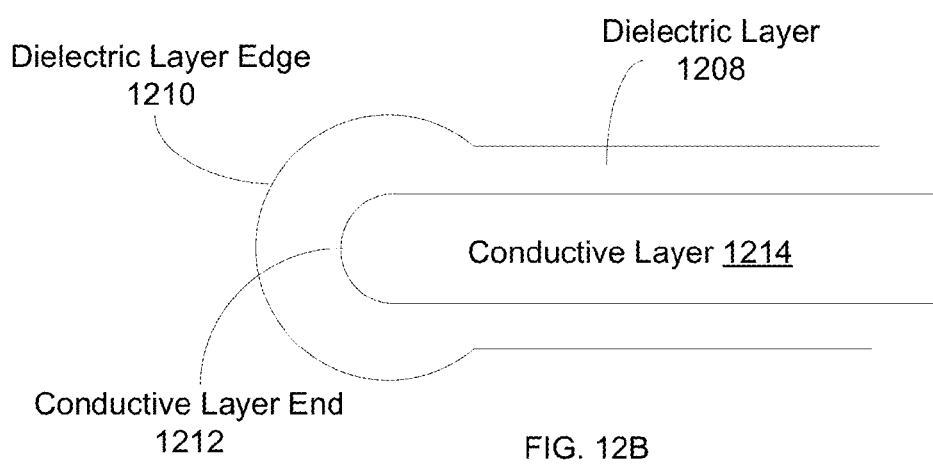
Figure 12C:
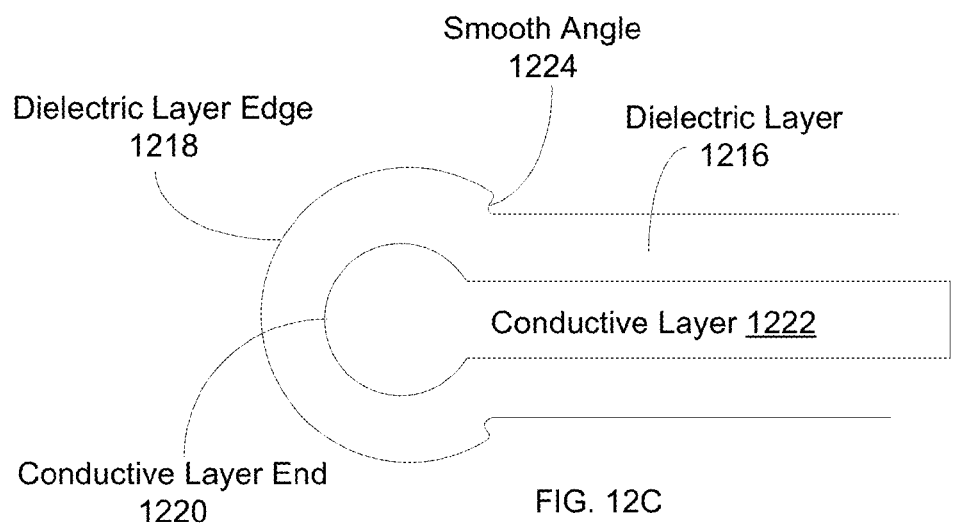

FIGS. 12A-C illustrate alternative configurations of a dielectric layer edge encompassing a conductive layer end, according to at least one embodiment. In FIG. 12A, dielectric layer 1200 may comprise a round and concave dielectric layer edge 1202 that encompasses a round and convex conductive layer end 1204 of a conductive layer 1206. In FIG. 12B, dielectric layer 1208 may comprise a bulbous and concave dielectric layer edge 1210 that encompasses a round and convex conductive layer end 1212 of a conductive layer 1214. The bulbous shape of dielectric layer edge 1210 may be thicker than the dielectric layer 1208. In FIG. 12C, dielectric layer 1216 may comprise a bulbous and concave dielectric layer edge 1218 that encompasses a bulbous and convex conductive layer end 1220 of a conductive layer 1222. The bulbous shape of dielectric layer edge 1218 may be thicker than the dielectric layer 1216, and may comprise smooth angle 1224 that may structurally resemble the letter "S", which eliminates unwanted sharp corners from the bulb configuration. In some embodiments, conductive layer end 1220 may also comprise smooth angle 1218 that may structurally resemble the letter "S".

In addition, the dielectric layer edges and/or conductive layer ends of FIGS. 12A-C may comprise a wavy structure to increase surface area of the respective layer. A secondary or a tertiary wavy configuration may also be added to further increase surface area of the respective layer.

Figure 13A:
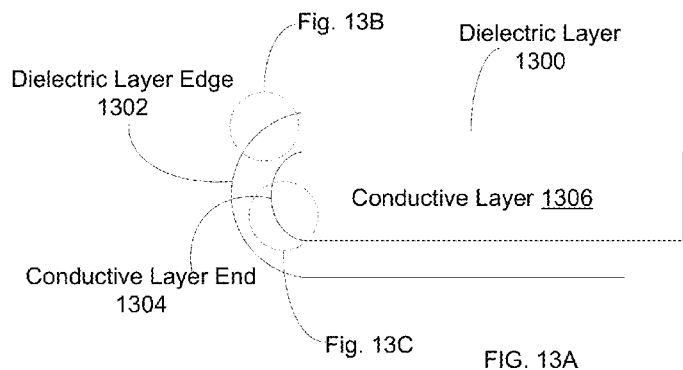
FIG. 13A-E illustrate dielectric layer edges comprising a wavy structure encompassing conductive layer ends also comprising a wavy structure, according to at least one embodiment.
Figure 13B:
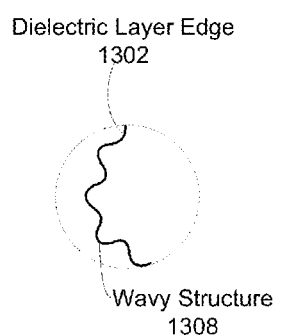
Figure 13C:
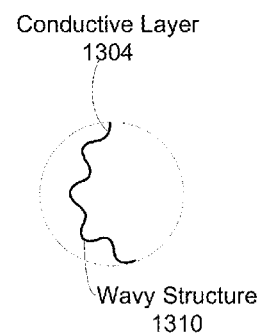
Figure 13D:
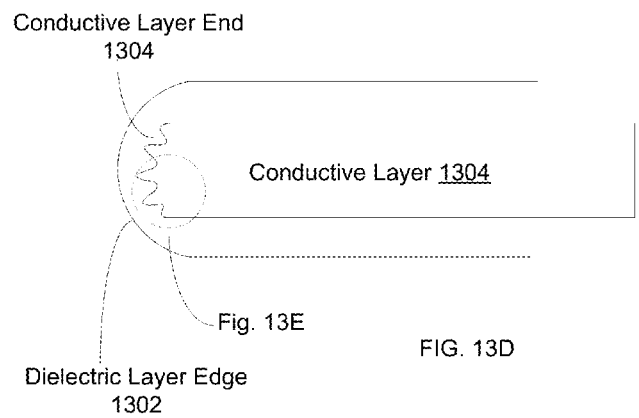
Figure 13E:
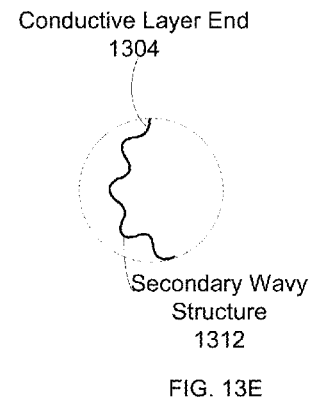

FIG. 13A-E illustrate dielectric layer edges comprising a wavy structure encompassing conductive layer ends also comprising a wavy structure, according to at least one embodiment. In FIG. 13A, a dielectric layer 1300 may comprise dielectric layer edge 1302 comprising a round shape. The dielectric layer edge 1302 may also comprise a bulbous shape. The dielectric layer edge 1302 may encompass a conductive layer end 1304 of a conductive layer 1306 comprising a round shape. The conductive layer end 1304 may also comprise of a bulbous shape. FIG. 13B shows that dielectric layer edge 1302 may additionally comprise wavy structure 1308, while FIG. 13C shows that conductive layer end 1304 may also additionally comprise wavy structure 1310. In some embodiments, dielectric layer edge 1302 and/or conductive layer end 1304 comprising wavy structures may further comprise secondary (or tertiary wavy structures) to further increase surface area of the respective layer, as seen in FIGS. 13D-E. Secondary wavy structure 1312 may be disposed on conductive layer end 1304 comprising wavy structure 1310. Secondary wavy structure 1312 may also be disposed on dielectric layer edge 1302 comprising wavy structure 1308

Figure 14:
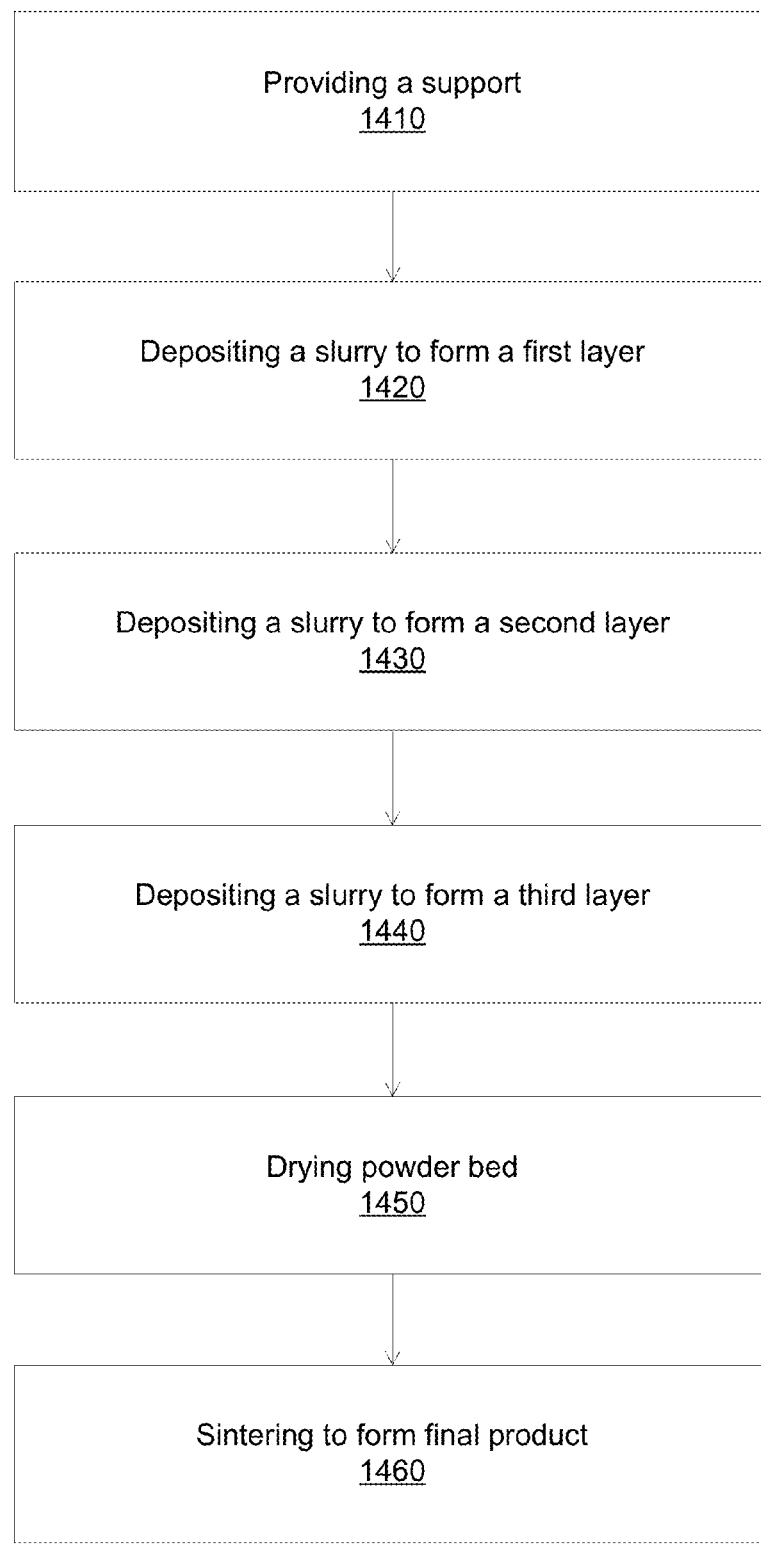
FIG. 14 is a flow diagram of a method of additive manufacturing that may be implemented in one or more embodiments of the present invention.

FIG. 14 is a flow diagram of a method of additive manufacturing that may be implemented in one or more embodiments of the present invention. Operation 1410 provides a support over a selected area. Operation 1420 deposits liquid slurry to form a first layer comprising conductive metal, such as, e.g., copper, nickel, silver, palladium, gold, and/or platinum. The slurry may be deposited as continuous parallel streams, or as individually controlled droplets, thereby generating a regular surface for each layer. Operation 1430 deposits liquid slurry to form a second layer comprising dielectric or ceramic material comprising barium titanate. Operation 1440 deposits liquid slurry to form a third layer. The third layer may comprise the same material as the first layer. The first and the third layers of the capacitor may comprise a convex round and/or bulbous and/or wavy configuration disposed at the conductive layer end. The second layer may comprise a concave round and/or bulbous and/or wavy configuration disposed at the dielectric layer edge. In some embodiments, operation 1420 and operation 1430 sequentially repeat until a predetermined amount of alternating layers of conductor and dielectric material is achieved. Operation 1450 dries the powder bed by flash drying, e.g., infrared heating. Operation 1460 sinters the layers to form a final product.

Figure 15:
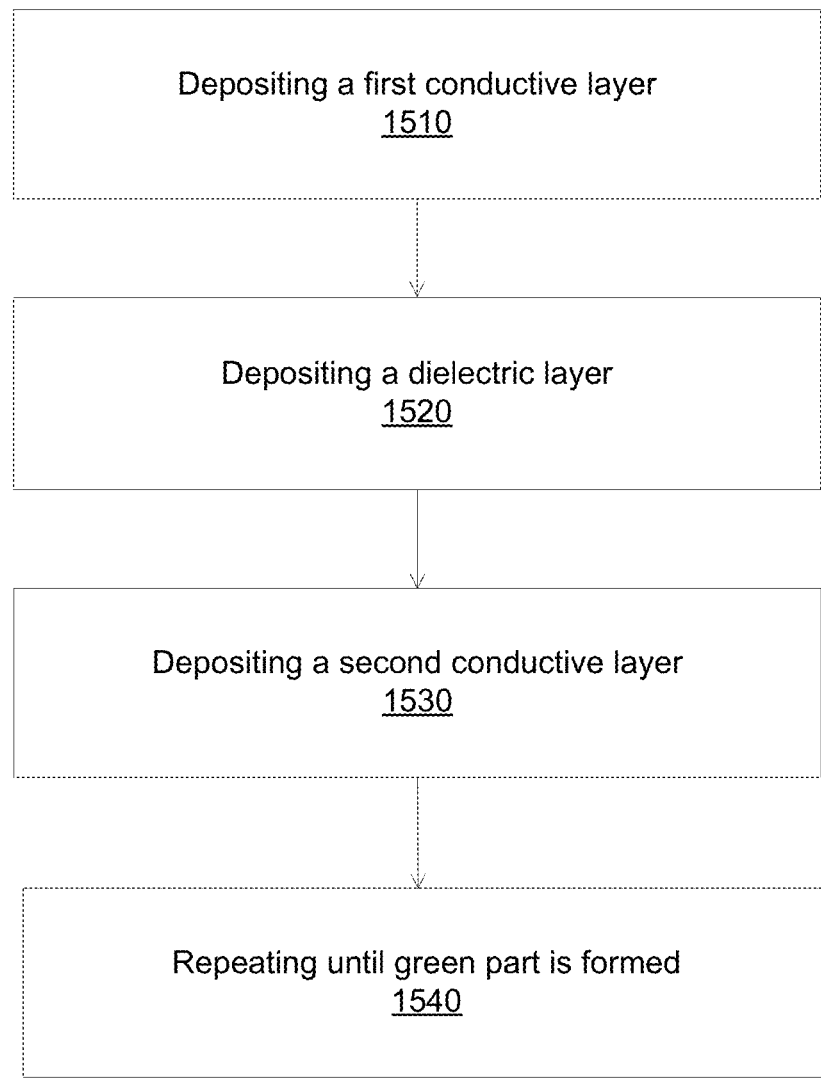
FIG. 15 is a flow diagram of another method of additive manufacturing that may be implemented in one or more embodiments of the present invention.

FIG. 15 is a flow diagram of another method of additive manufacturing that may be implemented in one or more embodiments of the present invention. Operation 1510 deposits a first conductive layer onto a surface. Operation 1520 deposits a dielectric layer on a top surface of the first conductive layer. Operation 1530 deposits a second conductive layer onto a top surface of the dielectric layer. Optionally, operation 1540 repeats operation 1520 and operation 1530 successively and sequentially such that the conductive layers and the dielectric layers alternate, and the conductive layers are disposed at both the bottom layer and the top layer, although in practice, the MLCCs may be manufactured with dielectric layers disposed at both the bottom layer and the top layer. The aforementioned steps may produce a ceramic capacitor comprising a first conductive layer formed on a surface of a dielectric layer, and a second conductive layer formed on the opposing surface of the dielectric layer. The first and the second conductive layers of the capacitor may comprise a convex round and/or bulbous and/or wavy configuration disposed at the conductive layer end. The dielectric layer may comprise a concave round and/or bulbous and/or wavy configuration disposed at the dielectric layer edge.

In at least one embodiment, the present invention discloses a system and a method for optimizing geometry of a multilayer ceramic capacitor by using an algorithm of a computing device comprising a memory and processor to determine electric field lines and equipotential lines. Optimum capacitance of the capacitor may be achieved when density of field lines is as nearly uniform as possible, which can be exploited through the algorithm. For example, the above-discussed bulbous ends of conductive layer ends may reduce separation of the layers due to the bulbous ends comprising a higher thickness. The algorithm may precisely space and orientate the bulbous ends such that the most separation is achieved to reduce the field lines, which maximizes capacitance of the MLCC.

Figure 16:
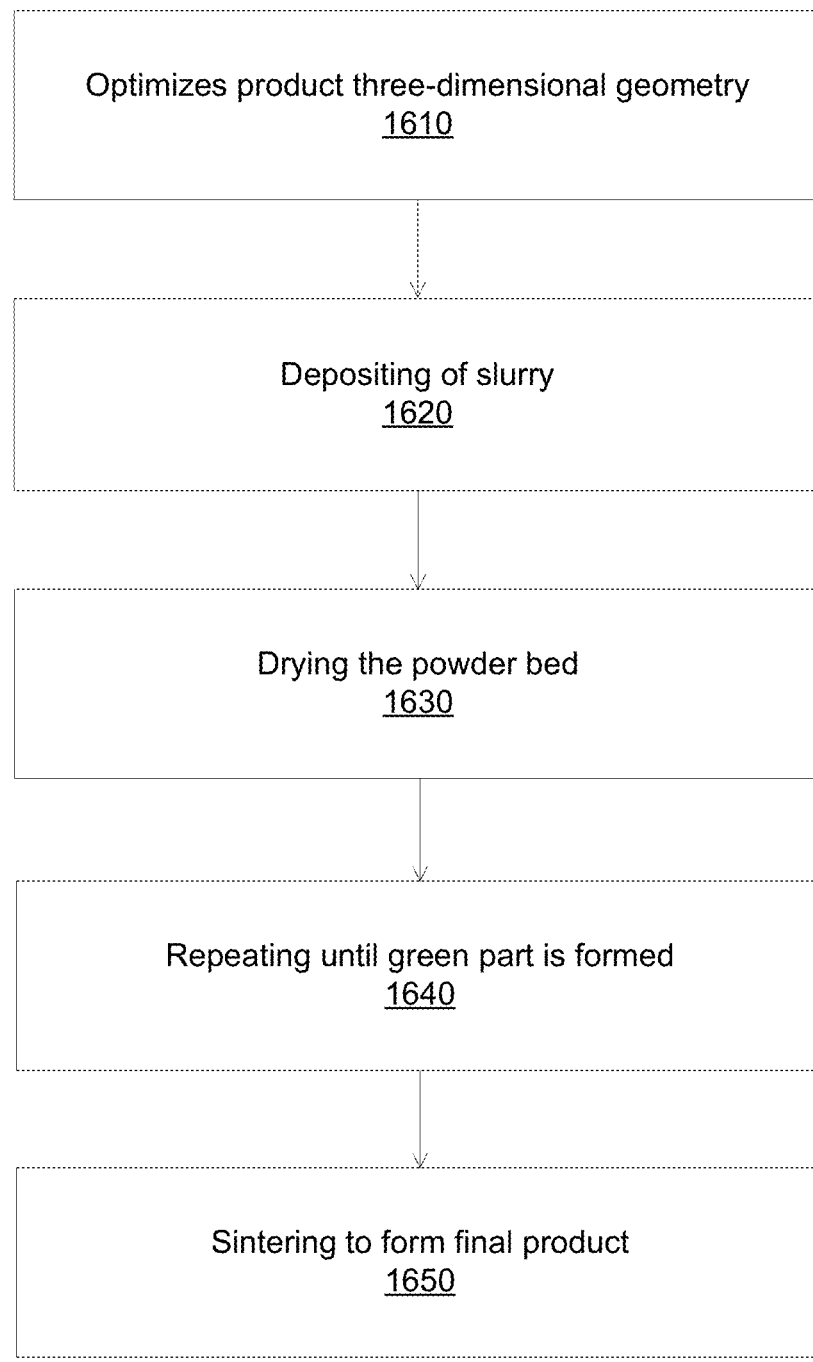
FIG. 16 is a flow diagram of a method of an additive printing process that may be implemented with one or more embodiments of the present invention.

FIG. 16 is a flow diagram of a method of an additive printing process that may be implemented with one or more embodiments of the present invention. Operation 1610 optimizes a final product's three-dimensional geometry using CAD software. An algorithm of a computing device may be used to maximize uniformity of electric field lines and equipotential lines to maximize capacitance of an MLCC. In operation 1620 deposits layers of slurry comprising powder material and binder onto a surface or on top of a powder bed, which then slip-casts to make a new layer. As the slurry deposits in each two dimensional layer, the printer may select insulator or conductor as the material type, in separate passes or as a combined pass. The slurry may be deposited in any suitable manner, including depositing in separate, distinct lines, e.g., by raster or vector scanning, by a plurality of simultaneous jets that coalesce before the liquid slip-casts into the bed, or by individual drops. The deposit of slurry drops may be individually controlled, thereby generating a regular surface for each layer. Operation 1630 dries any liquid from the powder bed, e.g., infrared flash-dry, after deposition of each layer. Operation 1640 repeats operations 1620 and 1630 until a green part is formed. Operation 1650 sinters the green part to form a final product. Sintering is a solid-state diffusion process that may be enhanced by increasing the surface area to volume ratio of the powder in any green part that is subsequently sintered.

Figure 17:
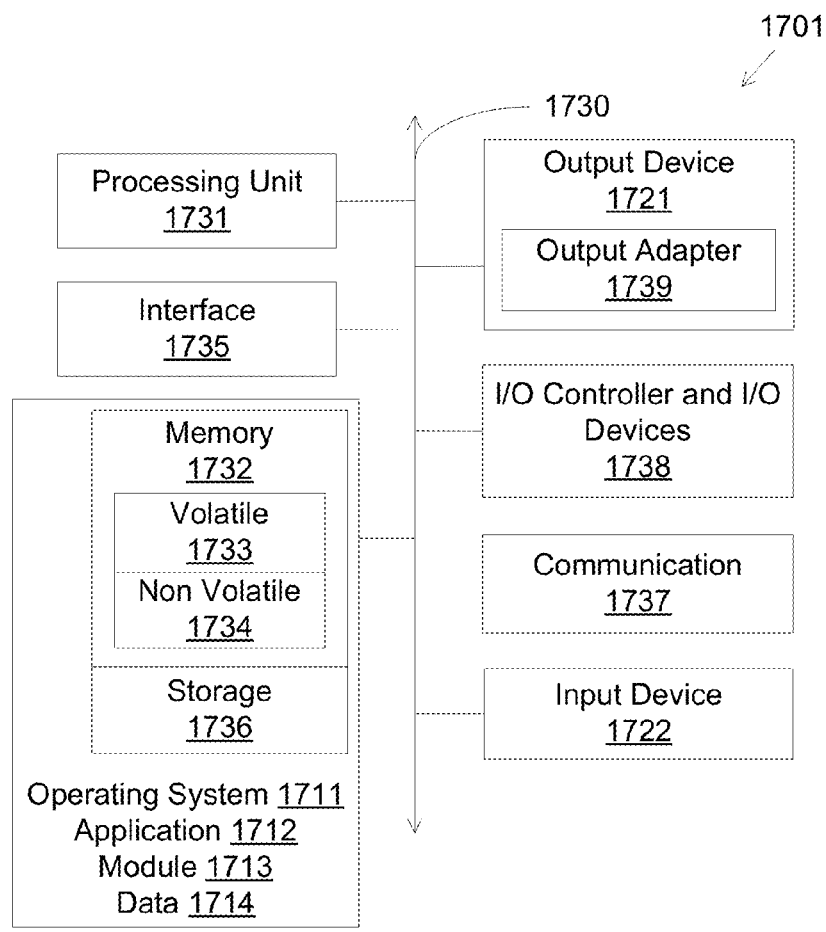
FIG. 17 illustrates a computing environment, according to some embodiments.

FIG. 17 illustrates a computing environment, according to some embodiments. An exemplary environment 1700 for implementing various aspects of the invention includes a computer 1701, comprising a processing unit 1731, a system memory 1732, and a system bus 1730. The processing unit 1731 may be any of various available processors, such as single microprocessor, dual microprocessors or other multiprocessor architectures. The system bus 1630 may be any type of bus structures or architectures, such as 12-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), or Small Computer Systems Interface (SCST).

The system memory 1732 may include volatile memory 1733 and nonvolatile memory 1734. Nonvolatile memory 1734 may include read only memory (ROM), programmable ROM (PROM), electrically programmable ROM (EPROM), electrically erasable ROM (EEPROM), or flash memory. Volatile memory 1733, may include random access memory (RAM), synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), or direct Rambus RAM (DRRAM).

Computer 1701 also includes storage media 1736, such as removable/nonremovable, volatile/nonvolatile disk storage, magnetic disk drive, floppy disk drive, tape drive, Jaz drive, Zip drive, LS-100 drive, flash memory card, memory stick, optical disk drive such as a compact disk ROM device (CD-ROM), CD recordable drive (CD-R Drive), CD rewritable drive (CD-RW Drive) or a digital versatile disk ROM drive (DVD-ROM). A removable or non-removable interface 1735 may be used to facilitate connection.

The computer system 1701 further may include software to operate in environment 1700, such as an operating system 1711, system applications 1712, program modules 1713 and program data 1714, which are stored either in system memory 1732 or on disk storage 1736. Various operating systems or combinations of operating systems may be used.

Input devices 1722 may be used to enter commands or data, and may include a pointing device such as a mouse, trackball, stylus, touch pad, keyboard, microphone, joystick, game pad, satellite dish, scanner, TV tuner card, sound card, digital camera, digital video camera, web camera, and the like, connected through interface ports 1738. Interface ports 1738 may include a serial port, a parallel port, a game port, a universal serial bus (USB), and a 1394 bus. The interface ports 1738 may also accommodate output devices 1721. For example, a USB port may be used to provide input to computer 1701 and to output information from computer 1701 to an output device 1721. Output adapter 1739, such as video or sound cards, is provided to connect to some output devices such as monitors, speakers, and printers.

Computer 1701 may operate in a networked environment with remote computers. The remote computers may comprise a memory storage device, and may be a personal computer, a server, a router, a network PC, a workstation, a microprocessor based appliance, a peer device or other common network node and the like, and typically includes many or all of the elements described relative to computer 1701. Remote computers may be connected to computer 1701 through a network interface and communication connection 1737, with wire or wireless connections. A network interface may be communication networks such as local-area networks (LAN), wide area networks (WAN) or wireless connection networks. LAN technologies include Fiber Distributed Data Interface (FDDI), Copper Distributed Data Interface (CDDI), Ethernet/IEEE 1202.3, Token Ring/IEEE 1202.5 and the like. WAN technologies include, but are not limited to, point-to-point links, circuit switching networks like Integrated Services Digital Networks (ISDN) and variations thereon, packet switching networks, and Digital Subscriber Lines (DSL).

Figure 18:
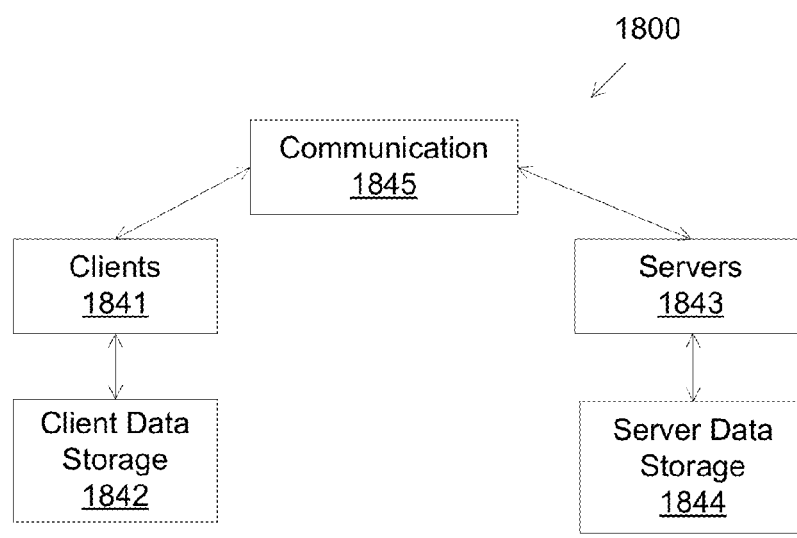
FIG. 18 is a schematic block diagram of a sample computing environment with which the present invention may interact.

FIG. 18 is a schematic block diagram of a sample computing environment 1800 with which the present invention may interact. The system 1840 includes a plurality of client systems 1841. The system also includes a plurality of servers 1843. The servers 1843 may be used to employ the present invention. The system includes a communication network 1845 to facilitate communications between the clients 1841 and the servers 1843. Client data storage 1842, connected to client system 1841, may store information locally. Similarly, the server 1843 may include server data storages 1844.

A number of embodiments have been described. Nevertheless, it will be understood that various modifications may be made without departing from the spirit and scope of the claimed invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims. It may be appreciated that the various systems, methods, and apparatus disclosed herein may be embodied in a machine-readable medium and/or a machine accessible medium, and/or may be performed in any order. The structures and modules in the figures may be shown as distinct and communicating with only a few specific structures and not others. The structures may be merged with each other, may perform overlapping functions, and may communicate with other structures not shown to be connected in the figures. Accordingly, the specification and/or drawings may be regarded in an illustrative rather than a restrictive sense.

What is claimed is:

1. A multilayer ceramic capacitor, comprising:
   a ceramic body;
   one or more dielectric layers alternately stacked with two or more conductive layers,
   wherein at least one conductive layer comprises a conductive layer end comprising at least one of a round shape, a bulbous shape, and a wavy shape;
   a pair of external termination disposed at opposite end portions of the body,
   wherein the two or more conductive layers are alternately coupled to an external termination of the pair of external termination, and wherein the bulbous shape of the conductive layer end comprises a greater thickness than the conductive layer.

2. The multilayer ceramic capacity of claim 1, further comprising:
wherein the bulbous shape of the conductive layer end comprises a smooth angle, and
wherein the smooth angle resembles the letter "S".

3. A multilayer ceramic capacitor, comprising:
a ceramic body;
a conductive layer comprising at least one of a base metal and a noble metal;
a dielectric layer comprising barium titanate,
wherein one or more dielectric layers are alternately stacked with two or more conductive layers,
wherein at least one conductive layer comprises a conductive layer end comprising a convex shape,
wherein at least one dielectric layer comprises a dielectric layer edge comprising a concave shape,
wherein the two or more conductive layers are alternately coupled to an external termination of the pair of external termination, and
wherein an electric field is generated between two juxtapose conductive layers when voltage is applied to the pair of external termination.

4. The multilayer ceramic capacitor of claim 3, further comprising:
wherein the concave shape of the dielectric layer edge encompasses the convex shape of the conductive layer end.

5. The multilayer ceramic capacitor of claim 3, further comprising:
wherein the convex shape of the conductive layer end permits the dielectric layer to comprise a greater width disposed at a top portion and at a bottom portion than at a center portion.

6. The multilayer ceramic capacitor of claim 3, further comprising:
wherein a distance between the conductive layer end and the dielectric layer edge is less than 500 microns.

7. The multilayer ceramic capacitor of claim 3, further comprising:
wherein a distance between the conductive layer end and the dielectric layer edge is greater than a thickness of the dielectric layer.

8. A multilayer ceramic capacitor, comprising:
a ceramic body;
one or more dielectric layers alternately stacked with two or more conductive layers,
wherein at least one conductive layer comprises a plane disposed in an xy-direction, a perimeter in a z-direction surrounding and in direct contact with the plane, and a corner, and
wherein at least one of the plane, the perimeter, and the corner alternates between a round shape and a non-round shape.

9. A multilayer ceramic capacitor, comprising:
a ceramic body;
one or more dielectric layers alternately stacked with two or more conductive layers,
wherein at least one conductive layer comprises a conductive layer end comprising at least one of a round shape, a bulbous shape, and a wavy shape;
a pair of external termination disposed at opposite end portions of the body,
wherein the two or more conductive layers are alternately coupled to an external termination of the pair of external termination,
wherein the at least one round shape and bulbous shape comprises a wavy shape, and
wherein the wavy shape comprises a secondary wavy shape.

10. A multilayer ceramic capacitor, comprising:
a ceramic body;
one or more dielectric layers alternately stacked with two or more conductive layers,
wherein at least one conductive layer comprises a conductive layer end comprising at least one of a round shape, a bulbous shape, and a wavy shape;
a pair of external termination disposed at opposite end portions of the body,
wherein the two or more conductive layers are alternately coupled to an external termination of the pair of external termination,
wherein at least one dielectric layer comprises a dielectric layer edge encompassing the conductive layer end,
wherein the dielectric layer edge comprises at least one of an inverse round shape, an inverse bulbous shape, and an inverse wavy shape, and
wherein the bulbous shape of the dielectric layer edge comprises a greater thickness than the dielectric layer.

11. The multilayer ceramic capacitor of claim 10, further comprising:
wherein the at least one inverse round shape and inverse bulbous shape comprises a wavy shape, and
wherein the inverse wavy shape comprises a secondary wavy shape.

12. The multilayer ceramic capacitor of claim 10, further comprising:
wherein the bulbous shape of the dielectric layer edge comprises a smooth angle, and
wherein the smooth angle resembles the letter "S".

* * * * *